United States Patent [19]
Paczkowski

[11] Patent Number: 5,767,931
[45] Date of Patent: Jun. 16, 1998

[54] COMPOSITE FOR PLASTIC LIQUID CRYSTAL DISPLAY

[75] Inventor: Mark Anthony Paczkowski, Andover, N.J.

[73] Assignee: Lucent Technologies Inc., Murray Hill, N.J.

[21] Appl. No.: 554,210

[22] Filed: Oct. 24, 1995

[51] Int. Cl.$^6$ .................................................. G02F 1/1333
[52] U.S. Cl. ................................................ 349/158; 349/182
[58] Field of Search ...................................... 349/158, 182, 349/105; 445/25

[56] References Cited

U.S. PATENT DOCUMENTS 4,228,574  10/1980  Culley et al. .
5,336,535  8/1994  Fukuchi et al. .

OTHER PUBLICATIONS

Patent Abstracts of Japan—vol. 95, No. 005.
Patent Abstracts of Japan—vol. 007, No. 121 (P-199), May 25, 1983.
Patent Abstracts of Japan—vol. 008, No. 010 (P-248), Jan. 18, 1984.
Patent Abstracts of Japan—vol. 006 No. 018 (P-100), Feb. 2, 1982.
Patent Abstracts of Japan—vol. 010, No. 026 (P-425), Jan. 31, 1986.

*Primary Examiner*—William L. Sikes
*Assistant Examiner*—James A. Dudek

[57] ABSTRACT

A method and composite for doubled-sided processing of plastic substrates that can be used as the plates in a liquid crystal display are disclosed. In one embodiment, the composite comprises an ultraviolet light (UV) blocking layer that is sandwiched between two plastic substrates. A layer of indium-tin-oxide (ITO) is disposed on one side of each of the two plastic substrates. The plastic substrates are arranged so that the ITO layer on each substrate faces outwardly. The resulting composite sandwich structure is laminated and can be rolled-up or sheared into individual sheets for further processing.

27 Claims, 4 Drawing Sheets

COMPOSITE FOR PLASTIC LIQUID CRYSTAL DISPLAY

FIELD OF THE INVENTION

This invention relates to a composite for use in manufacturing liquid crystal displays. More particularly, this invention relates to methods and composites useful in manufacturing liquid crystal displays utilizing double-sided processing.

BACKGROUND OF THE INVENTION

Liquid crystal displays (LCDs) are used extensively in watches, calculators, radios, laptop computers and, more recently, in flat screen and projection television systems.

In a typical arrangement, a LCD is formed by placing two glass plates very close to one another so that a small gap is formed between the plates. Each glass plate has a polarizing film on its outer surface. A transparent electrical conductor is deposited on the inner surface of each glass plate. In a passively addressed display, the transparent conductor is patterned into a series of mutually perpendicular lines, i.e., row and column electrodes. The row and column electrodes define a plurality of cells.

The gap between the plates is filled with a liquid crystal polymer material. The liquid crystal polymer material, typically a cyanobiphenyl, has the ability to rotate the direction of polarized light. Polarization direction follows the physical rotation of the liquid crystal molecules, i.e., the direction of the long axis of the molecules.

Typically, a liquid crystal material is used which forms loosely organized chains that rotate from one side of the gap to the other side. As such chains rotate or "twist," so do the axes of the individual liquid crystal molecules. Light, which is polarized as it passes through the entrance polarizer, has its polarization direction rotated following the physical rotation of the liquid crystal polymer molecules as the light passes through the cell. In a typical arrangement, the polarizer on the exit side of the display passes light that has had its polarization direction rotated in the manner described. Viewed from the exit side, such a cell is clear, or transmitting.

The alignment of the liquid crystal molecules, and, hence, the polarization direction of light passing through the liquid crystal, can be changed by applying an external electric field. Applying a voltage across the cell gap by addressing the appropriate line on each side of the cell causes the chains of liquid crystal molecules to align themselves with the applied electric field, "untwisting" as they align. Since the polarization direction of light passing through such "untwisted" liquid crystal polymer is not rotated, such light is blocked from exiting the cell by the exit polarizer, which passes only rotated light. Such a cell appears dark from the exit side. When the voltage is turned off, the liquid crystal returns to its original state, and the pixel is clear again. See generally, O'Mara W., "Liquid Crystal Flat Panel Displays—Manufacturing Science and Technology", Van Nostrand Reinhold (1993).

In typical prior art methods for manufacturing LCDs, each of the two glass plates are processed separately. The processing of each plate includes the deposition of various layers, device patterning and other techniques. After each plate is processed, it is mated with its complement and liquid crystal material is injected into the gap between the plates. In recent advances, some manufacturers are replacing the glass plates with plastic.

There are a number of drawbacks to such prior art manufacturing methods. Processing the plates separately is time consuming or, alternatively, expensive if another processing line is added to process plates in parallel. Further, each of the complementary plates may experience different processing conditions resulting in errors when registering the plates. And, the alignment process itself is susceptible to error. Processing is further complicated by the use of plastic materials. Such plastics are typically very thin, light, flexible and generally troublesome to handle without damage. Furthermore, typical alignment systems are optical in nature and developed for use with rigid materials.

SUMMARY OF THE INVENTION

A method and composite for doubled-sided processing of plastic substrates that can be used as the plates in a liquid crystal display is disclosed. According to one embodiment of the invention, an ultraviolet light (UV) blocking layer is sandwiched between two plastic substrates. A layer of indium-tin-oxide (ITO) is disposed on one side of each of the two plastic substrates. The plastic substrates are arranged so that the ITO layer on each substrate faces outward. The resulting composite sandwich structure is laminated and can be rolled-up or sheared into individual sheets for further processing.

If the substrate is sheared into individual sheets, the electrodes can be formed in a manner similar to inner-layer processing in the printed circuit board industry. Thus, existing facilities can be used for processing.

In the double-sided processing of the present invention, circuitry can be photoimaged on the bottom and top plastic substrates simultaneously. Mechanical registration features are placed into both substrates after photoimaging so that there is minimal loss of registration in subsequent cell assembly steps. The sandwich structure can be separated any time after the mechanical registration features are added.

BRIEF DESCRIPTION OF THE DRAWINGS

Further features of the invention will become apparent from the following detailed description of specific embodiments thereof when read in conjunction with the accompanying drawings in which like elements have like reference numbers and in which.

DETAILED DESCRIPTION OF THE INVENTION

Figure 1:
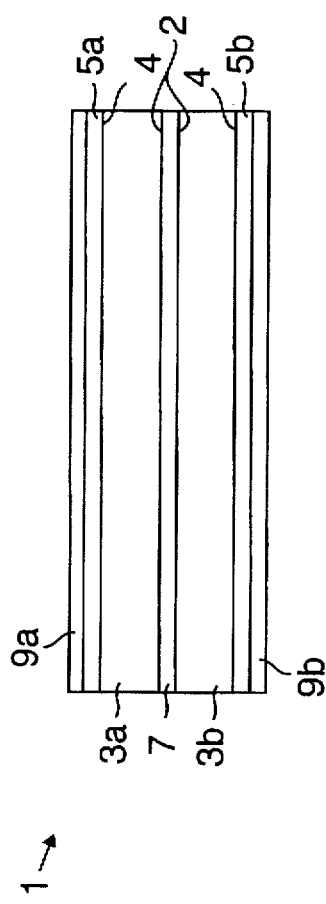
FIG. 1 is a cross-sectional view of a composite according to the present invention wherein two suitably-treated plastic substrates are temporarily attached to a UV-blocking substrate.

Referring to FIG. 1, one embodiment of a composite 1 according to the present invention includes an ultraviolet light (UV)-blocking layer 7 sandwiched between an upper plastic substrate 3a and a lower plastic substrate 3b. The outer surfaces 4 of the upper and lower plastic substrates 3a, 3b are coated with layers 5a and 5b, respectively, of transparent electrode material. In a preferred embodiment, thin protective layers 9a, 9b are placed over the electrode layers 5a, 5b, respectively, to insure that the electrode layers are not damaged during handling.

The plastic substrates 3a, 3b should have a high glass transition temperature and, for twisted nematic (TN) liquid crystal polymer material, should have low birefringence. Further, the plastic substrates 3a, 3b should be clear, i.e. water-white. Suitable plastics include, without limitation, polyethylene terephthalate and polyethersulfone. Preferably, the plastic substrates have a thickness of about 4 to 7 mils, but could be of any suitable thickness.

The transparent electrode layers 5a, 5b are preferably indium-tin-oxide (ITO) or ITO combined with other materials, such as gold, to improve conductivity. The layers 5a, 5b are preferably about 700 to 2000 angstroms thick. The layers 5a, 5b are typically sputter deposited onto the plastic substrate. The sputtering process is controlled so that the layers 5a, 5b are transparent, easily patterned and have a resistivity appropriate for the display application. The deposition of ITO by sputtering and other methods is well known to those skilled in the art. See, O'Mara W., "Liquid Crystal Flat Panel Displays—Manufacturing Science and Technology", Van Nostrand Reinhold (1993) at pp 114–117. This reference, and all other references mentioned in this specification are incorporated herein by reference in their entirety.

In a preferred embodiment, the UV-blocking layer 7 can be any material that is flexible, punchable and suitable for blocking ultraviolet light. Preferably, the UV-blocking layer 7 should have an optical density of 3 or greater at wavelengths of 400 nanometers (nm) and less. To achieve or promote flexibility, the UV-blocking layer 7 is preferably about 1 to 10 mils in thickness. Flexibility is required for "reel-to-reel" processing applications wherein, after formation, the composite 1 is wound about a roller, as discussed below. If the composite is sheared into individual sheets, the UV-blocking layer 7 can be rigid and thicker.

Suitable materials for the UV-blocking layer include, without limitation metal or paper. Plastic can also be used for the UV-blocking layer, provided that the plastic adsorbs light in the appropriate range of wavelengths. In particular, the plastic should absorb light at the wavelength or wavelengths at which the photoresist (which is used to pattern the transparent electrode layers 5a, 5b as described below) is sensitive; typically about 400 nm or less. Certain plastics, by virtue of their structure, absorb light at the appropriate wavelength. Nylon is one such example. Other suitable plastics will be known to those skilled in the art.

Furthermore, most plastics can be modified, by incorporating additives, to absorb light in the aforementioned range of wavelengths. For example, polyethylene terephthalate can be filled with carbon black so that it absorbs light having a wavelength of 400 nm or less. Such a modified polyethylene terephthalate is suitable for the UV-blocking layer 7.

In a further embodiment of the present invention, the composite comprises two substrates 3a, 3b, which, in addition to possessing the properties previously described for the substrates, further absorb light at the appropriate wavelengths as described above. In such an embodiment, the composite comprises two substrates and no discreet UV-blocking layer 7. Neither nylon nor carbon black filled-polyethylene terephthalate will be appropriate for this embodiment since such materials are not suitably transparent. An example of a plastic suitable for this embodiment is an appropriate grade of an imidized acrylate. Imidized acrylates are available from AtoHass of Philadelphia, Pa. under the trademark KAMAX™. Other suitable plastics will be known to those skilled in the art. Furthermore, an appropriate amount of benzotriazole derivatives can be used as a non-yellowing additive for plastics to cause them to absorb light in the range of 400 nm or less. Other additives suitable for such a purpose are known to those skilled in the art. Selecting an appropriate grade of plastic, or determining an appropriate amount of additive, as described above, is within the capabilities of one skilled in the art.

The protective layers 9a, 9b are preferably about 1 mil in thickness and formed of polyethylene terephthalate or like plastics.

Figure 2:
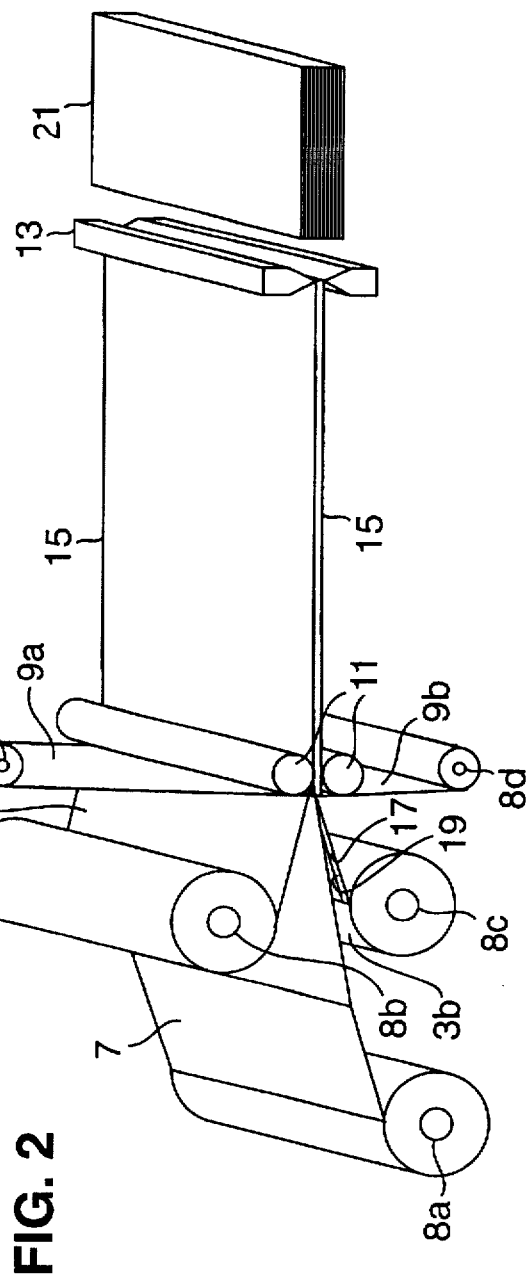
FIG. 2 is a perspective view of an arrangement for forming the composite of FIG. 1.

FIG. 2 is an exemplary embodiment of an arrangement suitable for forming the composite 1. Preferably, the various materials forming the composite 1 are wound on rollers, such as rollers 8a–8c, and fed to a means for pressing the materials together, such as laminating rollers 11. In a preferred embodiment, the edges 15 of the composite are sealed after lamination using plastic welding methods such as ultrasonic bonding and the like. If the material is sheared into sheets, such as the sheet 21, the cut edges are preferably likewise sealed. Thus, equipment, not shown, for sealing the composite is preferably located near the laminating rollers 11 and the cutter 13. Because the sheets are sealed on all four sides, the composite is held together by vacuum until such time as separation is required.

In a further embodiment, rather than welding the edges of the composite, an adhesive 19 may be disposed on the outer edges 17 of the inner surface 2 of the upper or lower plastic substrates 3a, 3b to form a bond to maintain the various layers of the composite in abutting relation. Alternatively, the adhesive 19 may be disposed on the outer edges of both surfaces of the UV-blocking layer 7.

In a further embodiment, a weak adhesive may be applied over larger portions of both surfaces of the UV-blocking layer 7 so that the upper and lower substrates 3a, 3b can be temporarily bonded to the UV-blocking layer across the full width of the substrates rather than at the edges only. In this alternate embodiment, it is important that a weak adhesive is used since the upper and lower substrates 3a, 3b of the composite 1 must be separated from one another in subsequent processing steps. The protective layers 9a, 9b, if present, need not be welded or glued to each other or the preceding substrate layers 3a, 3b since such layers are removed well before the rest of the composite is separated and will remain abutted to the substrate layers via a static attraction.

It is preferable to use a plastic welding method or an adhesive, in conjunction with laminating rollers 11, to bond the various layers together. In other less preferred embodiments, the composite 1 can be bonded using laminating rollers or other devices for pressing the layers together, alone. In such embodiments, the pressing or lamination step should be performed at a temperature at which the UV-blocking layer 7 or substrate layers 3a, 3b will soften. Alternatively, a coating layer, selected for its ability to soften at the lamination temperature, can be added to the UV-blocking layer 7 or substrate layers 3a, 3b.

After bonding, the composite 1 may be rolled-up around a roller, not shown, or sheared into individual sheets through the use of a cutter or shearer 13. The composite 1, either rolled or sheared, is then ready for further processing. If the composite 1 is sheared, it is preferably sheared into sheets having dimensions typically suitable for wiring board manufacture, such as 18 inches (in.)×24 in. or 24 in.×24 in.

Figure 3:
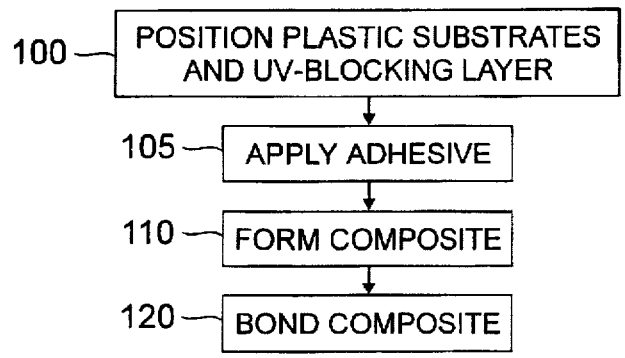
FIG. 3 is a flow diagram illustrating an embodiment of a method for forming the composite of FIGS. 1 and 2.

A first embodiment of a method according to the present invention is illustrated in FIG. 3. In step 100, two plastic substrates, such as the plastic substrates 3a, 3b, that have been coated on one side with a transparent electrode material, such as the transparent electrode material 5a, 5b, are suitably positioned for further processing. The present method may include the step of coating the substrates 3a, 3b with transparent electrode material, however, it is presently preferred to have the substrates 3a, 3b precoated by a facility specializing in such operations. Further, a material suitable for blocking ultraviolet light, such as the UV-blocking layer 7, is positioned so that it will be sandwiched between the substrates 3a and 3b as the composite is formed.

If an adhesive is applied as a step in the present method, it can be applied in step 105. Such adhesive may be applied as described above or in any other manner suitable for bonding the composite as will occur to those skilled in the art in view of the present teachings. In an alternate embodiment, adhesive may be pre-applied by the supplier of the UV-blocking layer 7 or the substrates. If the composite is sheared into sheets, it is preferable to supplement the adhesive bond to the edges 15 of the composite with a further bond to each sheared end. This can be accomplished in step 120, described below.

In step 110, the composite 1 is formed by sandwiching the UV-blocking layer 7 between the two plastic substrates 3a, 3b and passing them through the laminating rollers 11 or other means for pressing the various layers together. The plastic substrates 3a, 3b are positioned so that the surface 2 of each of the substrates is proximal to the UV-blocking layer 7. Thus, the transparent electrode material 5a, 5b faces outwardly relative to the UV-blocking layer 7.

In an alternate embodiment, the composite formed in step 110 further comprises protective layers, such as the protective layers 9a, 9b, as shown in FIG. 2, for example. In this embodiment, the two substrates 3a, 3b and the UV-blocking layer 7 are sandwiched between the protective layers 9a, 9b.

In step 120, the composite is bonded/sealed to keep the various layers of the composite in proper abutting relation. Bonding can be accomplished by the ultrasonic bonding method mentioned above or by other plastic welding methods known to those skilled in the art. As such, equipment suitable for plastic welding may be positioned to weld the composite as it emerges from the laminating rollers 11 and after the cutter 13, if present. As previously noted, if an adhesive is used as in step 105, or pre-applied by a supplier, bonding is accomplished in step 110 as the various layers are drawn through the laminating rollers 11 or like device. It is desirable, however, to supplement the aforementioned adhesive bond by bonding the sheared edges of the composite (if the composite is to be sheared into sheets) using plastic welding methods. Further, as previously described, "bonding" can take place in step 110 if lamination is performed at suitable temperature such that the various layers soften.

Figure 4:
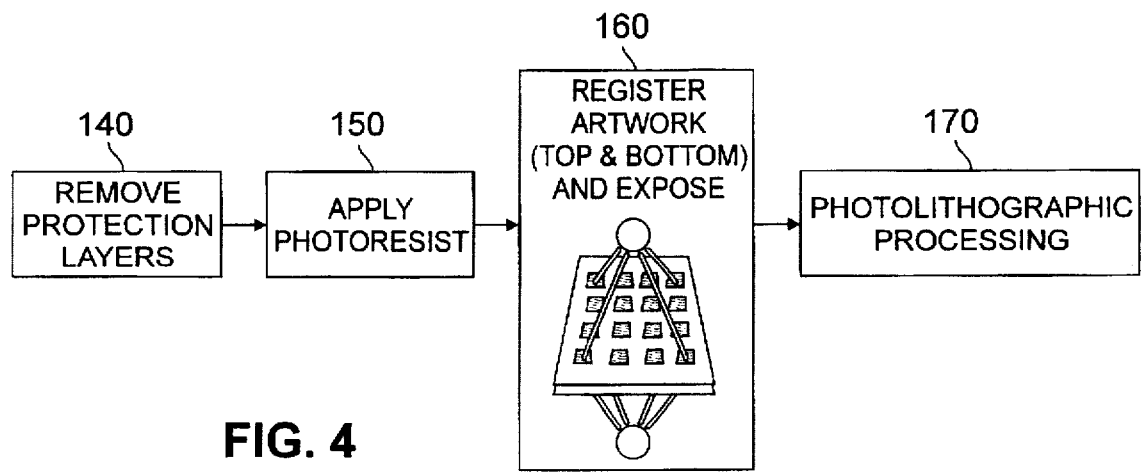
FIG. 4 is a flow diagram illustrating a method according to the present invention for forming the electrodes.
Figure 5:
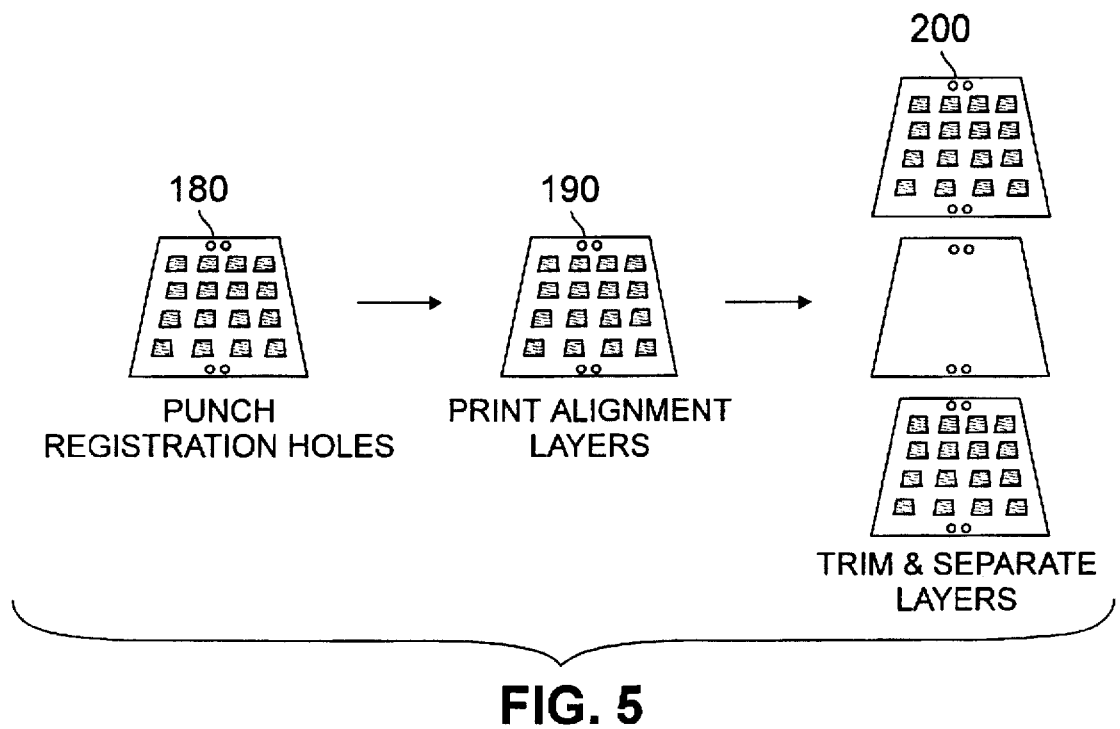
FIG. 5 illustrates steps pertaining to registration and alignment for forming a liquid crystal display.
Figure 6:
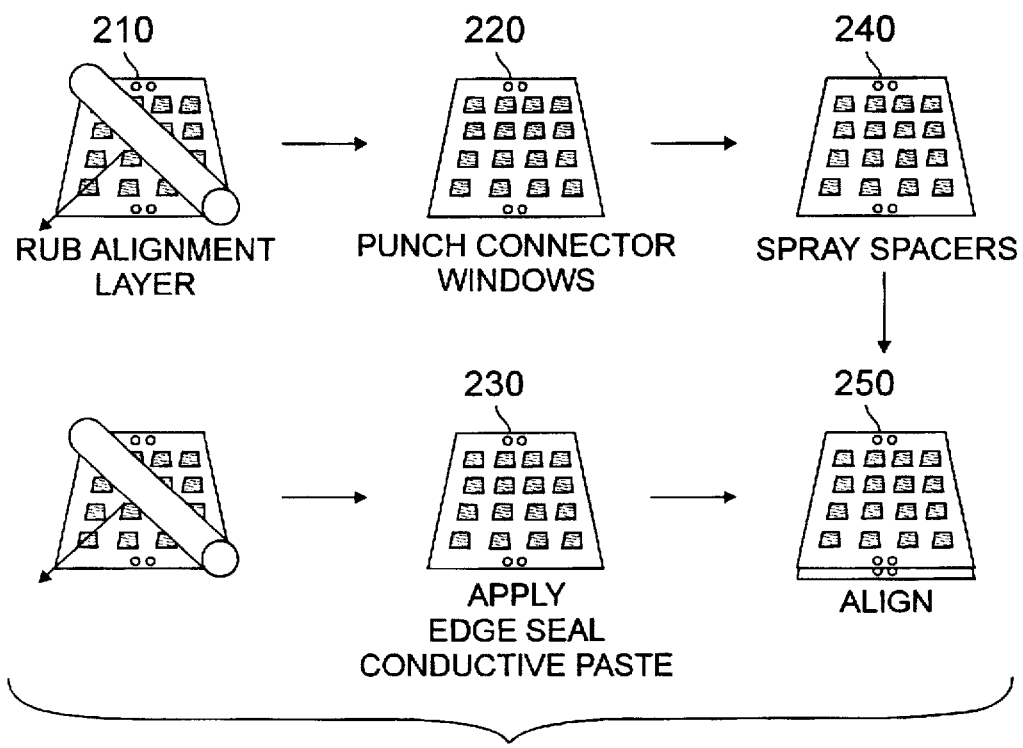
FIGS. 6 & 7 illustrate steps pertaining to joining complementary plates in a process for forming a liquid crystal display.
Figure 7:
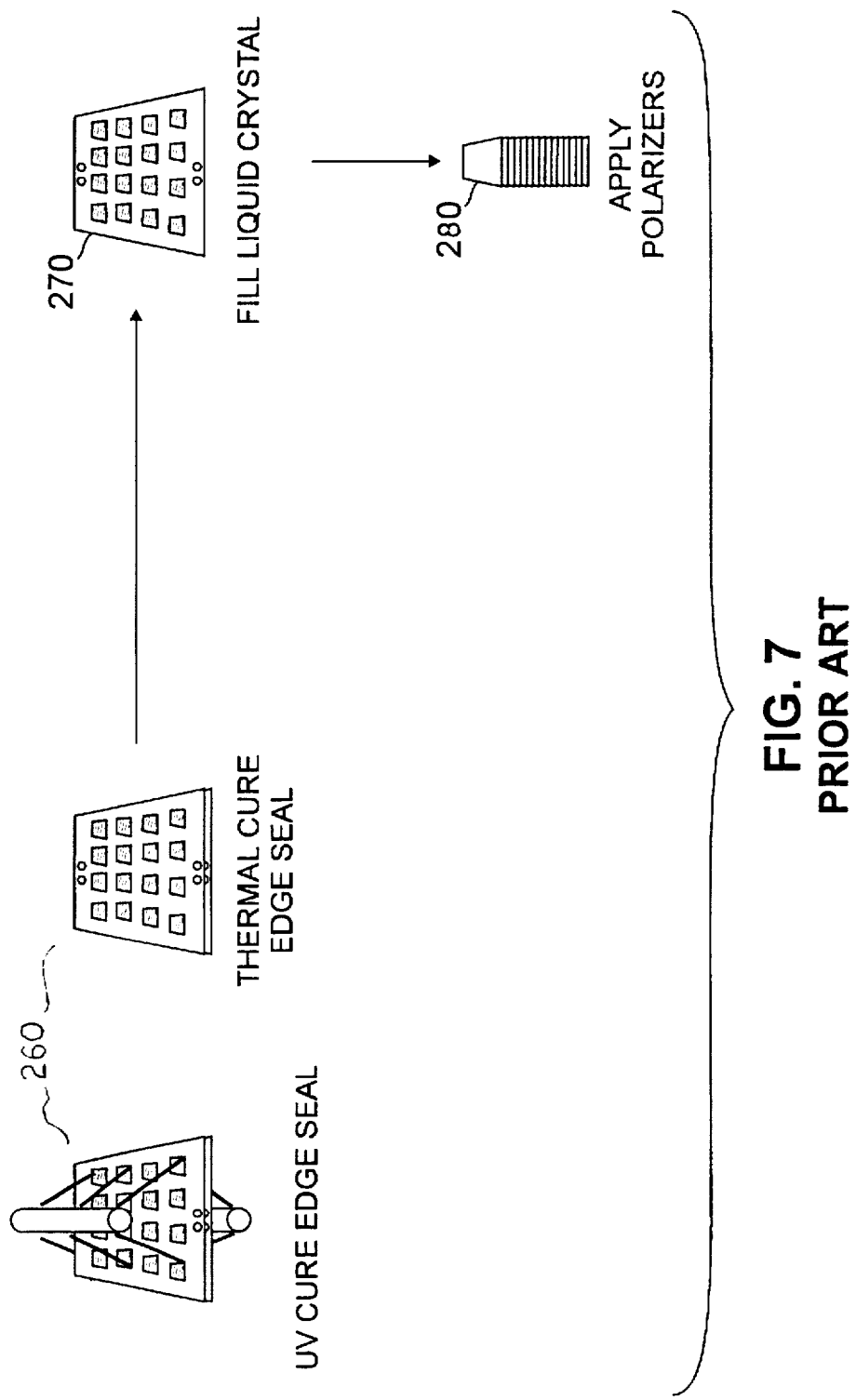

As described above, once the composite 1 is formed, it may be rolled-up or sheared for further processing. Such further processing, which is described in more detail below, includes patterning the electrodes, as illustrated in FIG. 4, and punching registration holes, depositing the alignment layers and separating the composite, which are illustrated in FIG. 5. Additional processing is required to form the liquid crystal display. Such additional processing, which is illustrated in FIGS. 6 and 7, is well known in the art and will not be discussed in detail.

Substantial changes occur to the substrates 3a, 3b as they are processed to become the "plates" of the LCD such that it would not be inappropriate to refer to them by a descriptor other than "substrate". For clarity, however, the term "substrate" will be used in this specification regardless of the extent to which the substrates 3a, 3b have been processed, i.e., photolithographic processing, deposition of further layers, etc.

Returning to FIG. 4, the protective layers 9a, 9b, if present, are stripped in step 140. Photoresist is then applied to the layers of transparent electrode material 5a, 5b on each of the plastic substrates 3a, 3b in step 150. In step 160, the art work or masks for patterning the transparent electrode material into stripes, lines or rectangular plates are placed in registration with each of the upper and lower plastic substrates 3a, 3b and then exposed with UV light. Since the composite 1 incorporates the UV-blocking layer 7, the mask attached to the upper plastic substrate 3a and the mask attached to the lower plastic substrate 3b can be exposed simultaneously. Mechanical registration features, such as holes, may be punched into the plastic substrates 3a, 3b any time after exposure. The use of plastic for the LCD plates, rather than glass, facilitates incorporation of mechanical registration features.

In step 170, typical photolithographic processing steps such as development, etching, stripping, drying and the like are performed.

It is preferable to pattern the electrode material using photolithographic methods as discussed above and as illustrated in FIG. 4. Screen or offset printing methods, however, can likewise be used to pattern the electrode material. Such printing methods are well known to those skilled in the art. If screen or offset printing methods are used, the UV-blocking layer 7 is not required. Throughout this specification, the word "pattern," as used in the context of patterning the electrode material, refers to either photolithographic or printing methods.

As shown in FIGS. 4–7, electrodes are patterned at a plurality of discrete regions on a sheet of the composite 1, such as the sheet 21 shown in FIG. 2. Each of such regions will eventually be cut and trimmed to form one of the plates of an LCD. A number of such plates are thus formed on a single sheet of the composite. It should therefore be appreciated that while the description will generally refer to the formation of a single LCD from sheets of the substrates 3a, 3b, a plurality of such LCDs are typically formed.

As previously noted, registration features, such as holes, can be punched in the composite 1 at any time after exposure of the photoresist. This procedure is indicated in step 180 of FIG. 5.

In step 190, a thin polymer film referred to as an alignment layer or orientation film is deposited on the transparent electrode layer 5a, 5b, which has since been patterned. The alignment layer facilitates orientation of the liquid crystal molecules at the surface of the plastic substrate. Suitable polymer materials and methods for depositing such polymers are well known to those skilled in the art.

In step 200, the bonded edges of the composite 1 are trimmed so that the plastic substrates 3a, 3b can be separated from one another, delaminating the composite.

While it is preferable to deposit the alignment layer prior to delaminating the composite 1, the deposition described in step 190 can be performed after delamination.

After separation, the alignment layer on each of the plastic substrates 3a, 3b is rubbed in a chosen direction, as illustrated in step 210 of FIG. 6. Rubbing leaves fine grooves in the surface of the alignment layer that aid in aligning the liquid crystal molecules at the plastic substrate surface, and also promotes a proper "tilt" angle. Methods for rubbing and control of tilt angle through rubbing pressure and speed are known to those skilled in the art. Rubbing and other processing steps that will be mentioned below are known in the art and are typically employed in forming LCDs.

After rubbing, the plastic substrates 3a, 3b are cleaned and dried, and then, in step 220, connector windows are punched through one of the plastic substrates. In steps 230 and 240, edge seal is applied and spacers are deposited on one of the plastic substrates to allow a precise gap between the upper and lower plastic substrate 3a, 3b to be formed and maintained. As shown in step 250, the upper and lower plastic substrates are then brought together and aligned. Alignment is accomplished using a mechanical alignment system and the registration features. For more critical applications, an optical alignment system can also be used. As shown in step 260 of FIG. 7, the edge seal that was applied in step 230 can be either UV- or thermally-cured. Liquid crystal material is injected between the laminated plastic substrates in step 270. To allow for injection, the plastic substrates comprising the plurality of "plates" is typically cut to provide rows or columns of such plates with one cut edge. In the final step 280, a polarizer is applied to the outside of each plastic substrate.

It should be understood that the embodiments described in this specification are illustrative of the principles of the present invention and are not intended limit the scope of the invention.

I claim:

1. A composite useful for forming a liquid crystal display comprising:
   a first and a second substrate having a first and a second surface, each substrate having a transparent electrode material disposed on the first surface thereof; and
   a layer suitable for blocking ultraviolet light located between and abutting the second surface of the first and the second substrate.

2. The composite of claim 1 further comprising a protective layer abutting the transparent electrode material.

3. The composite of claim 1 wherein the first and second substrate is a plastic selected from the group consisting of polyethylene terephthalate and polyethersulfone.

4. The composite of claim 1 wherein the transparent electrode material is selected from the group consisting of indium-tin-oxide and an alloy of indium-tin-oxide and gold.

5. The composite of claim 1 wherein the layer suitable for blocking ultraviolet light is selected from the group consisting of plastic, metal and paper.

6. The composite of claim 2 wherein the protective layer is polyethylene terephthalate.

7. A composite useful for forming a liquid crystal display, wherein transparent electrode material is patterned into electrodes using photoresist reactive to light within a range of wavelengths, comprising
   a first and a second substrate having a first and a second surface, each substrate having the transparent electrode material disposed on the first surface thereof, and further wherein at least the first substrate is substantial opaque at the reactive wavelength.

8. The composite of claim 7 further comprising a protective layer abutting the transparent electrode material.

9. A method for forming a composite suitable for forming a liquid crystal display comprising the steps of:
   providing a first and a second substrate having a first and a second surface, each substrate having a transparent electrode material disposed on the first surface thereof;
   providing a layer suitable for blocking ultraviolet light, said layer having a first and a second surface;
   positioning the layer suitable for blocking ultraviolet light between the second surface of the first and the second substrate; and
   bonding the first substrate, the layer suitable for blocking ultraviolet light and the second substrate, together, forming a composite.

10. The method of claim 9 wherein the step of bonding comprises:
    (a) applying an adhesive to the second surface of at least the first substrate or to the first and second surface of the layer suitable for blocking ultraviolet light;
    (b) pressing the first substrate, the layer suitable for blocking ultraviolet light and the second substrate, together.

11. The method of claim 10 wherein the step of applying the adhesive comprises applying adhesive to both side edges of the second surface of at least the first substrate.

12. The method of claim 10 wherein the step of applying the adhesive comprises applying adhesive to both side edges of the first and second surface of the layer suitable for blocking ultraviolet light.

13. The method of claim 9 wherein the step of providing a first and a second substrate further comprises providing a first and a second substrate wherein an adhesive has been disposed on at least one of said substrates.

14. The method of claim 9 wherein the step of providing a layer suitable for blocking ultraviolet light further comprises providing said layer wherein an adhesive has been disposed on both the first and second surface of the layer.

15. The method of claim 9 wherein the step of bonding comprises:
    (a) pressing the first substrate, the layer suitable for blocking ultraviolet light and the second substrate, together; and
    (b) welding together the edges of the first and second substrate and the layer suitable for blocking ultraviolet light.

16. The method of claim 9 further comprising cutting the composite to form sheets of a predetermined length.

17. The method of claim 9 further comprising:
    providing a first and second layer protection layer suitable for protecting the transparent electrode material; and
    positioning the substrates and the ultraviolet light blocking layer between the first and second protection layer.

18. A method for forming a composite suitable for forming a liquid crystal display comprising the steps of:
    (a) providing a first and a second substrate, each substrate having a transparent electrode material disposed on a first surface thereof;
    (b) positioning the first and second substrate so that they will be in superposed and abutting relation in step (c); and
    (c) bonding the first and second substrates together, forming a composite,
    wherein, when the first and second substrates are bonded in step (c), the transparent electrode material is unpatterned.

19. The method of claim 18 wherein the step of providing a first and second substrate further comprises providing said substrates on rollers.

20. The method of claim 19 wherein the step of bonding comprises drawing the first and the second substrate through laminating rollers wherein the substrates are pressed together.

21. The method of claim 20 wherein the step of bonding further comprises sealing at least two edges of composite using adhesive or plastic welding methods.

22. A method for forming a liquid crystal display utilizing a double-sided processing method wherein plastic substrates that will serve as plates for said display are joined to form a composite and simultaneously processed to pattern electrodes and then marked with registration features, comprising the steps of:

(a) forming a composite comprising a first and a second substrate;

(b) patterning a transparent electrode material that is disposed on a first surface of each of the substrates;

(c) forming registration features in the first and second substrates; and (d) separating the composite to isolate the first and second substrate for further processing toward the formation of a liquid crystal display.

23. The method of claim 22 wherein the composite formed in step (a) further comprise a layer suitable for blocking ultraviolet light sandwiched between a second surface of the first and the second substrate.

24. The method of claim 23 wherein step (d) further comprises the steps of:

(i) depositing an alignment layer on the patterned transparent electrode material on each of the first and second substrates;

(ii) rubbing each alignment layer;

(iii) preparing the first and second substrate for lamination by aligning the registration features;

(iv) laminating the first and second substrate together;

(v) injecting liquid crystal material between the laminated substrates; and (vi) applying polarizers to the first and second substrate.

25. The method of claim 24 wherein step (i) is performed prior to separating the composite.

26. A method for forming a liquid crystal display utilizing a composite comprising a first and a second plastic substrate, the plastic substrates each having a transparent electrode material disposed on a first surface thereof, comprising the steps of:

(a) patterning the transparent electrode material that is disposed on each of the first and second substrates;

(b) forming registration features in the first and second substrates; and (c) separating the composite to isolate the first and second substrate for further processing toward the formation of a liquid crystal display.

27. The method of claim 26 wherein step (c) further comprises the steps of:

(i) depositing an alignment layer on the patterned transparent electrode material on each substrate;

(ii) rubbing each alignment layer;

(iii) preparing the first and second substrate for lamination by aligning the registration features;

(iv) laminating the first and second substrate together;

(v) injecting liquid crystal material between the laminated substrates; and (vi) applying polarizers to the first and second substrate.

* * * * *